(12) United States Patent
Hsieh et al.

(10) Patent No.: US 10,663,743 B2
(45) Date of Patent: May 26, 2020

(54) OPTICAL WAVELENGTH CONVERSION MODULE AND ILLUMINATION MODULE

(71) Applicant: Coretronic Corporation, Hsin-Chu (TW)

(72) Inventors: Chi-Tang Hsieh, Hsin-Chu (TW); Jo-Han Hsu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 149 days.

(21) Appl. No.: 16/020,986

(22) Filed: Jun. 27, 2018

(65) Prior Publication Data

US 2019/0011713 A1     Jan. 10, 2019

(30) Foreign Application Priority Data

Jul. 4, 2017  (CN) .......................... 2017 1 0536575

(51) Int. Cl.
*G02B 5/28*       (2006.01)
*G02B 27/10*      (2006.01)
(Continued)

(52) U.S. Cl.
CPC ....... *G02B 27/1006* (2013.01); *G02F 1/3775* (2013.01); *G02F 1/353* (2013.01)

(58) Field of Classification Search
CPC .......... G02B 5/003; G02B 5/20; G02B 5/201; G02B 5/207; G02B 5/22; G02B 5/26;
(Continued)

(56) References Cited

U.S. PATENT DOCUMENTS

| 10,353,282 | B2 * | 7/2019 | Yamamoto | ............ | G01S 7/4817 |
| 2015/0232751 | A1 * | 8/2015 | Lin | ...................... | C09K 11/675 |
| | | | | | 359/885 |

(Continued)

FOREIGN PATENT DOCUMENTS

| CN | 101331430 | 12/2008 |
| CN | 102565016 | 7/2012 |

(Continued)

OTHER PUBLICATIONS

"Office Action of China Counterpart Application," dated Dec. 2, 2019, p. 1-p. 6.

(Continued)

*Primary Examiner* — Arnel C Lavarias
(74) *Attorney, Agent, or Firm* — JCIPRNET (57) ABSTRACT

An optical wavelength conversion module including a substrate, a driving device, and a first phosphor material layer is provided. The first phosphor material layer is disposed on a first optical region of the substrate. A conversion beam generated by the first phosphor material layer is a yellowish green beam when a phosphor temperature of the first phosphor material layer is close to or equal to an ambient temperature. The conversion beam generated by the first phosphor material layer is a yellow beam when the phosphor temperature of the first phosphor material layer is close to or exceeds a preset temperature. The driving device is connected to the substrate. The driving device is adapted to drive the substrate to act when the optical wavelength conversion module is in an operating state, so that the yellow beam is emitted from the first optical region. An illumination module is also provided.

13 Claims, 3 Drawing Sheets

(51) Int. Cl.
*G02F 1/377* (2006.01)
*G02F 1/35* (2006.01)

(58) Field of Classification Search
CPC ..... G02B 5/28; F21K 2/00; F21K 2/04; F21K 9/64; F21K 2099/005; G02F 1/353; G02F 1/3532; G02F 1/355; G02F 1/3551; G02F 1/3556; H01S 3/0092; H01S 5/0092
USPC ....... 359/288, 289, 321, 326, 327, 328, 329, 359/330, 577, 580, 582, 586, 587, 588, 359/589, 590, 885, 889, 891; 372/21, 22, 372/23, 108, 109
See application file for complete search history.

(56) References Cited

U.S. PATENT DOCUMENTS

| | | | | |
|---|---|---|---|---|
| 2016/0040833 | A1* | 2/2016 | Zehetner | H01L 25/075 362/84 |
| 2017/0089758 | A1 | 3/2017 | Okamoto et al. | |
| 2017/0328540 | A1* | 11/2017 | Paul | G02B 26/008 |

FOREIGN PATENT DOCUMENTS

| | | |
|---|---|---|
| CN | 103792635 | 5/2014 |
| CN | 104298059 | 1/2015 |
| CN | 104765236 | 7/2015 |
| CN | 105739226 | 7/2016 |
| CN | 106154713 | 11/2016 |
| CN | 106190123 | 12/2016 |
| CN | 106200217 | 12/2016 |
| CN | 205992115 | 3/2017 |
| CN | 102661576 | 7/2017 |
| EP | 2637224 | 9/2013 |
| JP | H11199781 | 7/1999 |
| JP | 2016058213 | 4/2016 |
| TW | 201226531 | 7/2012 |
| TW | I502150 | 10/2015 |
| TW | I563690 | 12/2016 |
| WO | 2004053009 | 6/2004 |
| WO | 2015055088 | 4/2015 |

OTHER PUBLICATIONS

Yang Ying et al., "Optimization of synthesis condition of $Ca_3B_2O_6$ : $Eu^{3+}$, A (A=$Li^+$,$Na^+$,$K^+$) red phosphor ", New Chemical Materials, vol. 42, No. 4, Apr. 2014, pp. 142-144.

"Office Action of Taiwan Counterpart Application," dated Dec. 10, 2018, p. 1-p. 4.

* cited by examiner

OPTICAL WAVELENGTH CONVERSION MODULE AND ILLUMINATION MODULE

CROSS-REFERENCE TO RELATED APPLICATION

This application claims the priority benefit of China application serial no. 201710536575.9, filed on Jul. 4, 2017. The entirety of the above-mentioned patent application is hereby incorporated by reference herein and made a part of this specification.

BACKGROUND OF THE INVENTION

Field of the Invention

The invention relates to an optical wavelength conversion module and an illumination module.

Description of Related Art

The conventional optical wavelength conversion module usually uses a light-emitting element with a phosphor layer to produce a light beam for illumination. The phosphor layer, however, will absorb external energy. In the presence of a high energy beam (e.g., a laser beam), the temperature of the phosphor layer will be increased, which results in reduction of the fluorescence intensity (or luminous efficiency). The thermal quenching effect refers to a phenomenon that the fluorescence intensity of the phosphor layer drops as the phosphor temperature increases.

Figure 1:
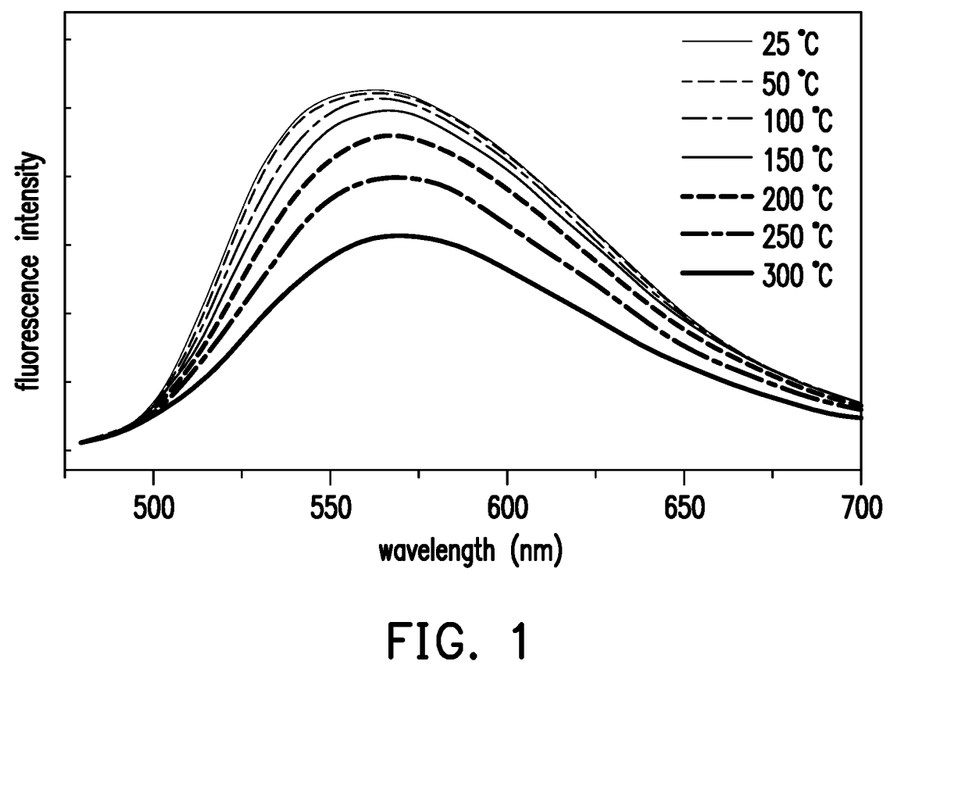
FIG. 1 is a wavelength-fluorescence intensity diagram of a YAG phosphor layer at different phosphor temperatures.
Figure 2:
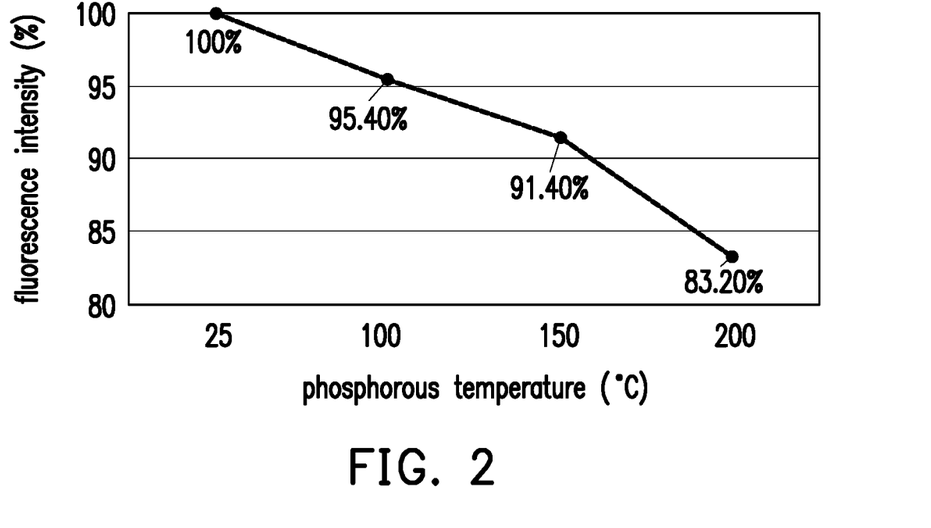
FIG. 2 is a phosphor temperature-fluorescence intensity diagram of the YAG phosphor layer.

Among phosphor materials, an Yttrium Aluminum Garnet (YAG) phosphor layer is particularly subject to the thermal quenching effect. FIG. 1 is a wavelength-fluorescence intensity diagram of the YAG phosphor layer at different phosphor temperatures. FIG. 2 is a phosphor temperature-fluorescence intensity diagram of the YAG phosphor layer. It is known from FIG. 1 and FIG. 2 that, as the phosphor temperature increases, the fluorescence intensity of the phosphor layer drops significantly. In addition, as the phosphor temperature increases, the emission spectrum of the phosphor layer tends to shift toward the red light region (that is, the emission spectrum shifts toward the long wavelength side).

The brightness of an illumination module that the human eyes perceive is a value obtained by integrating the emission spectrum of the phosphor layer with a human visual function. The human visual function describes the degrees of sensitivity of the human eyes to lights of different wavelengths. Since the human eyes are more sensitive to green light than red light, the shift of the emission spectrum toward the red wave band will cause the brightness as perceived by the human eyes to drop, and as the shift of the emission spectrum increases, attenuation of the brightness perceived by the human eyes becomes severe. In other words, as the phosphor temperature of the phosphor layer rises, not only the decrease of the fluorescence intensity lowers the brightness of the illumination module perceived by the human eyes, the shift of the emission spectrum toward the red wave band also causes the brightness to drop further. Take yellow beam as an example, if the region that is supposed to output a yellow beam outputs a red yellow beam instead due to the thermal quenching effect, it not only causes color distortion (the peak of the emission spectrum shifts toward red light) but also reduces the brightness perceived by the human eyes and affects the illumination quality.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention provides an optical wavelength conversion module, which is conducive to improving color distortion and reduction of perceived brightness resulting from the thermal quenching effect.

The invention further provides an illumination module which has favorable illumination quality.

In order to achieve at least one of the objects or other objects, an embodiment of the invention provides an optical wavelength conversion module, which includes a substrate, a driving device, and a first phosphor material layer. The driving device is connected to the substrate. The driving device is adapted to drive the substrate to act when the optical wavelength conversion module is in an operating state. The first phosphor material layer is disposed on a first optical region of the substrate. A conversion beam generated by the first phosphor material layer is a yellowish green beam when a phosphor temperature of the first phosphor material layer is close to or equal to an ambient temperature. The conversion beam generated by the first phosphor material layer is a yellow beam when the phosphor temperature of the first phosphor material layer is close to or exceeds a preset temperature. When the optical wavelength conversion module is in the operating state, the first optical region emits the yellow beam.

In order to achieve at least one of the objects or other objects, an embodiment of the invention provides an illumination module, which includes an excitation beam source and the optical wavelength conversion module described above. The excitation beam source provides an excitation beam. The optical wavelength conversion module is disposed on a transmission path of the excitation beam.

Based on the above, the embodiments of the invention have at least one of the following advantages or effects. With the pre-compensation mechanism, the phosphor material layer with the emission spectrum having a peak smaller than the peak of the desired emission spectrum is chosen, so as to achieve the effect of shifting the emission spectrum toward the short wavelength side when the phosphor temperature is close to or equal to the ambient temperature. By making the amount of the shift toward the short wavelength side close to or equal to the amount of the shift toward the long wavelength side, which occurs when the phosphor temperature of the phosphor material layer is close to or exceeds the preset temperature, the color of the conversion beam that is generated when the phosphor temperature of the phosphor material layer is close to or exceeds the preset temperature is close to or the same as the color desired to be outputted, and the brightness of the conversion beam perceived by the human eyes at different temperatures (e.g., the ambient temperature and the preset temperature) tends to be consistent. Accordingly, the optical wavelength conversion module of the embodiments of the invention is conducive to improving the problems of color distortion and reduction of perceived brightness resulting from the thermal quenching effect, and therefore the illumination module that utilizes the optical wavelength conversion module has favorable illumination quality.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 3:
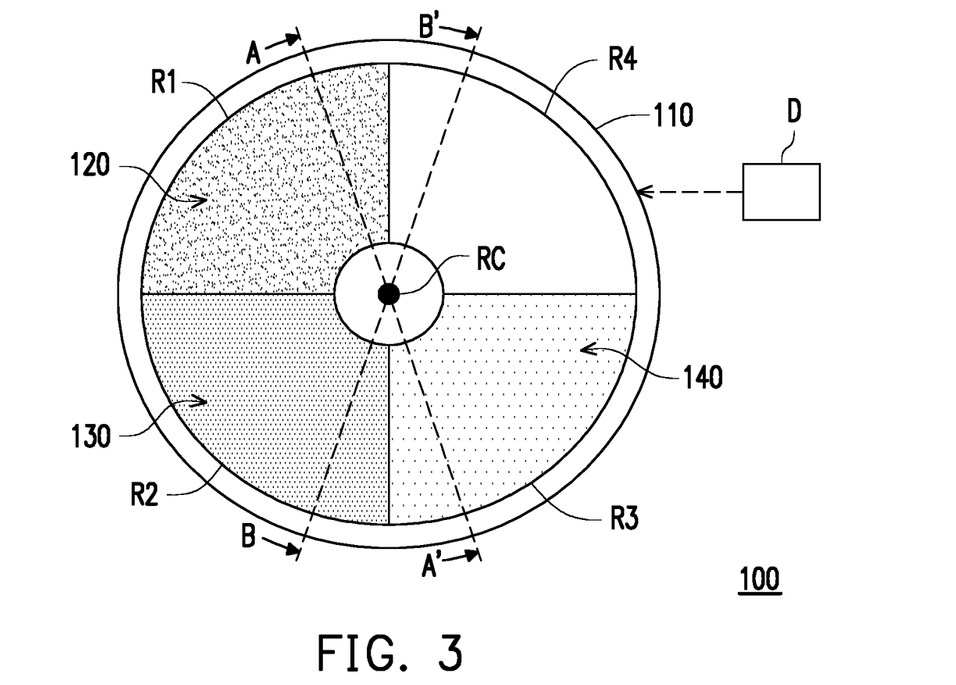
FIG. 3 is a schematic top view of an optical wavelength conversion module according to an embodiment of the invention.
Figure 4:
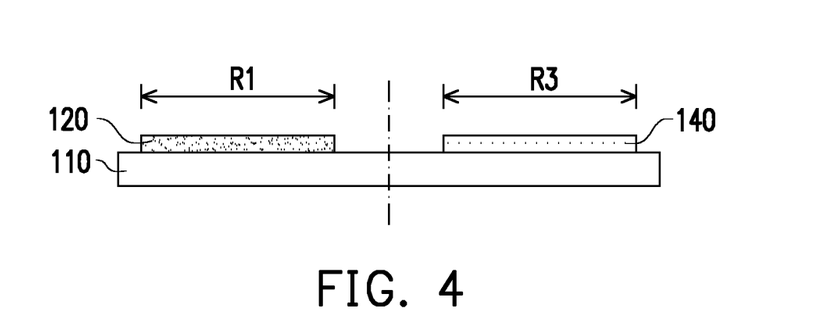
FIG. 4 and FIG. 5 are schematic cross-sectional views respectively taken along the lines A-A' and B-B' of FIG. 3.
Figure 5:
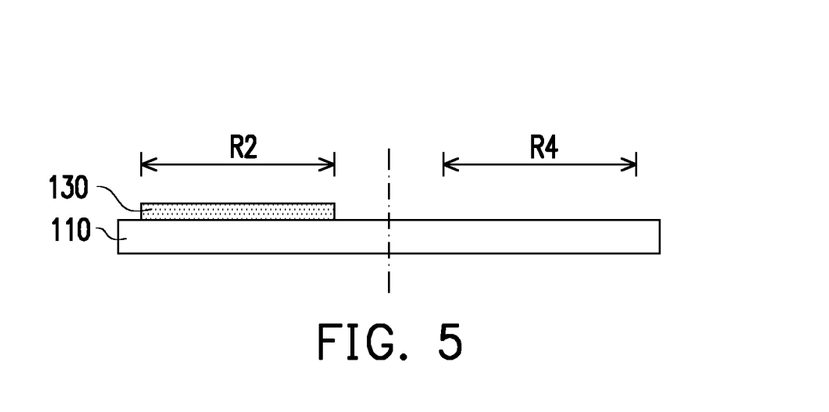

FIG. 3 is a schematic top view of an optical wavelength conversion module according to an embodiment of the invention. FIG. 4 and FIG. 5 are schematic cross-sectional views respectively taken along the lines A-A' and B-B' of FIG. 3. Referring to FIG. 3 to FIG. 5, an optical wavelength conversion module 100 according to an embodiment of the invention includes a substrate 110, a driving device D, and a first phosphor material layer 120.

The substrate 110 carries the first phosphor material layer 120. The substrate 110 may be a translucent substrate or a reflective substrate. The reflective substrate may be a metal plate, a white plate, or a translucent substrate with a light-receiving surface coated with a reflective film, but not limited thereto.

The driving device D is connected to the substrate 110, and is adapted to drive the substrate 110 to act when the optical wavelength conversion module 100 is in an operating state. For example, in an architecture where the substrate 110 is a circular carrier plate and has a rotation axis RC, when the optical wavelength conversion module 100 is irradiated by an excitation beam (not shown), the driving device D may be a rotating device that drives the substrate 110 to rotate around the rotation axis RC, such that the first phosphor material layer 120 disposed on the substrate 110 enters a transmission path of the excitation beam and is excited by the excitation beam to generate a conversion beam (not shown). Nevertheless, how the substrate 110 acts may be changed as required and is not limited to the above.

The first phosphor material layer 120 is disposed on a first optical region R1 of the substrate 110. The first phosphor material layer 120 is adapted to absorb a short wavelength beam (e.g., the excitation beam) and be excited to generate a long wavelength beam. For example, the first phosphor material layer 120 is an Yttrium Aluminum Garnet (YAG) phosphor layer, but not limited thereto.

When a phosphor temperature of the first phosphor material layer 120 is close to or equal to an ambient temperature (about 25 degrees Celsius), the conversion beam generated by the first phosphor material layer 120 is a yellowish green beam. When the phosphor temperature of the first phosphor material layer 120 is close to or exceeds a preset temperature, the conversion beam generated by the first phosphor material layer 120 is a yellow beam. Here, the preset temperature refers to a temperature that the first phosphor material layer 120 generally reaches when irradiated by a high energy concentrated excitation beam. Take an excitation beam with energy of 200 W or more as an example, the preset temperature is about 150 degrees Celsius. When the optical wavelength conversion module 100 is in the operating state, for example, when the first phosphor material layer 120 enters the transmission path of the high energy concentrated excitation beam, the phosphor temperature of the first phosphor material layer 120 changes from the ambient temperature to the preset temperature instantly, such that the first phosphor material layer 120 disposed on the first optical region R1 of the substrate 110 is excited to emit the yellow beam.

More specifically, the first optical region R1 is designed to output the yellow beam. For example, a peak of an emission spectrum of the yellow beam falls in a range of 548 nm to 550 nm. If the first phosphor material layer is formed with a phosphor material with the peak of the emission spectrum in the range of 548 nm to 550 nm, when irradiated by the high energy concentrated excitation beam, the peak of the emission spectrum of the first phosphor material layer shifts toward the long wavelength side (e.g., red wave band) due to the thermal quenching effect, which causes the conversion beam outputted from the first optical region R1 to shift and become a red yellow beam, instead of the expected yellow beam.

In view of the above, in this embodiment, the first phosphor material layer 120 with the emission spectrum that has a peak smaller than the peak of the desired emission spectrum (e.g., 548 nm to 550 nm) is chosen based on a pre-compensation mechanism. For example, the concentration of gadolinium ions ($Gd^{3+}$) in the phosphor material is adjusted to control the peak of the emission spectrum (the peak wavelength increases as the concentration of gadolinium ions increases; and the peak wavelength decreases as the concentration of gadolinium ions decreases), so as to achieve the effect of shifting the emission spectrum toward the short wavelength side (e.g., blue wave band) when the phosphor temperature is close to or equal to the ambient temperature. By making the amount of the shift toward the short wavelength side close to or equal to the amount of the shift toward the long wavelength side (e.g., red wave band), which occurs when the phosphor temperature of the first phosphor material layer 120 is close to or exceeds the preset temperature, the color of the conversion beam that is generated when the phosphor temperature of the first phosphor material layer 120 is close to or exceeds the preset temperature is close to or the same as the color desired to be outputted (yellow). In this embodiment, when the phosphor temperature of the first phosphor material layer 120 is close to or equal to the ambient temperature, the peak of the emission spectrum of the first phosphor material layer 120 falls in a range of 542 nm to 547 nm. That is, the conversion beam generated by the first phosphor material layer 120 at this time is the yellowish green beam. When the phosphor temperature of the first phosphor material layer 120 is close to or exceeds the preset temperature, the peak of the emission spectrum of the first phosphor material layer 120 falls in a range of 548 run to 550 nm. That is, the conversion beam generated by the first phosphor material layer 120 at this time is the yellow beam.

It should be noted that, although the thermal quenching effect may cause color distortion and reduction of the fluorescence intensity (reduction of the perceived brightness), the pre-compensation mechanism described above is able to compensate for the color distortion resulting from the thermal quenching effect. Moreover, human eyes have relatively consistent sensitivities to a yellowish green beam and a green beam, compared to a yellow beam and a red yellow beam. Therefore, after the emission spectrum is integrated with a human visual function, the pre-compensation mechanism described above also helps to make consistent the brightness of the conversion beam perceived by the human eyes at different temperatures (e.g., the ambient temperature and the preset temperature). Accordingly, the optical wavelength conversion module 100 of this embodiment of the invention is conducive to improving color distortion and reduction of perceived brightness resulting from the thermal quenching effect.

According to different requirements, the substrate 110 may include other optical regions, and the optical wavelength conversion module 100 may further include other phosphor material layers. For example, in addition to the first optical region R1, the substrate 110 may further include a second optical region R2, a third optical region R3, and a fourth optical region R4. In addition to the first phosphor material layer 120, the optical wavelength conversion module 100 may further include a second phosphor material layer 130 and a third phosphor material layer 140, wherein the peaks of the emission spectrum of the first phosphor material layer 120, the second phosphor material layer 130, and the third phosphor material layer 140 are different from one another. Nevertheless, the invention is not limited to the above, and the number of the optical regions and the number of the phosphor material layers may be changed as required.

The first optical region R1, the second optical region R2, the third optical region R3, and the fourth optical region R4 are disposed beside the rotation axis RC of the substrate 110 and are arranged sequentially along a circumference of the substrate 110, for example. Thus, when the optical wavelength conversion module 100 is in the operating state, the driving device D is adapted to drive the substrate 110 to rotate around the rotation axis RC. For example, when the optical wavelength conversion module 100 is irradiated by the excitation beam, the first optical region R1, the second optical region R2, the third optical region R3, and the fourth optical region R4 may enter the transmission path of the excitation beam in turn.

The second phosphor material layer 130 is disposed on the second optical region R2 of the substrate 110 and is adapted to absorb a short wavelength beam (e.g., the excitation beam) and be excited to generate a long wavelength beam. For example, the second phosphor material layer 130 is an Yttrium Aluminum Garnet (YAG) phosphor layer, but not limited thereto.

The second optical region R2 is designed to output a red beam or a red yellow beam, for example. Correspondingly, the second phosphor material layer 130 disposed on the second optical region R2 may be a known red phosphor material layer. Alternatively, based on the compensation mechanism described above, a phosphor material layer with the emission spectrum having a peak smaller than the peak of the desired emission spectrum may be chosen. For example, when a phosphor temperature of the second phosphor material layer 130 is close to or equal to the ambient temperature, a conversion beam generated by the second phosphor material layer 130 is a yellow beam; and when the phosphor temperature of the second phosphor material layer 130 is close to or exceeds the preset temperature, the conversion beam generated by the second phosphor material layer 130 is a red yellow beam. When the optical wavelength conversion module 100 is in the operating state, for example, when the second phosphor material layer 130 disposed on the second optical region R2 enters the transmission path of the excitation beam, the phosphor temperature of the second phosphor material layer 130 changes from the ambient temperature to the preset temperature, such that the second optical region R2 emits the red yellow beam. In this embodiment, when the phosphor temperature of the second phosphor material layer 130 is close to or equal to the ambient temperature, the peak of the emission spectrum of the second phosphor material layer 130 falls in a range of 548 nm to 550 nm. That is, the conversion beam generated by the second phosphor material layer 130 at this time is the yellow beam.

The third phosphor material layer 140 is disposed on the third optical region R3 of the substrate 110 and is adapted to absorb a short wavelength beam (e.g., the excitation beam) and be excited to generate a long wavelength beam. For example, the third phosphor material layer 140 is an Yttrium Aluminum Garnet (YAG) phosphor layer, but not limited thereto. The third optical region R3 is designed to output a green beam, for example. Correspondingly, the third phosphor material layer 140 disposed on the third optical region R3 may be a known green phosphor material layer. Alternatively, based on the compensation mechanism described above, a phosphor material layer with the emission spectrum having a peak smaller than the peak of the desired emission spectrum may be chosen. Details thereof are not repeated hereinafter.

No phosphor material layer is disposed in the fourth optical region R4, and the fourth optical region R4 is adapted for the excitation beam to pass through. In the case where the substrate 110 is the reflective substrate, the substrate 110 may have an opening that corresponds to the fourth optical region R4, such that the excitation beam is allowed to pass through the opening of the substrate 110 when the fourth optical region R4 enters the transmission path of the excitation beam. On the other hand, as shown in FIG. 5, in the case where the substrate 110 is the translucent substrate, the opening is not formed, and the excitation beam may directly pass through the fourth optical region R4 of the substrate 110.

Figure 6:
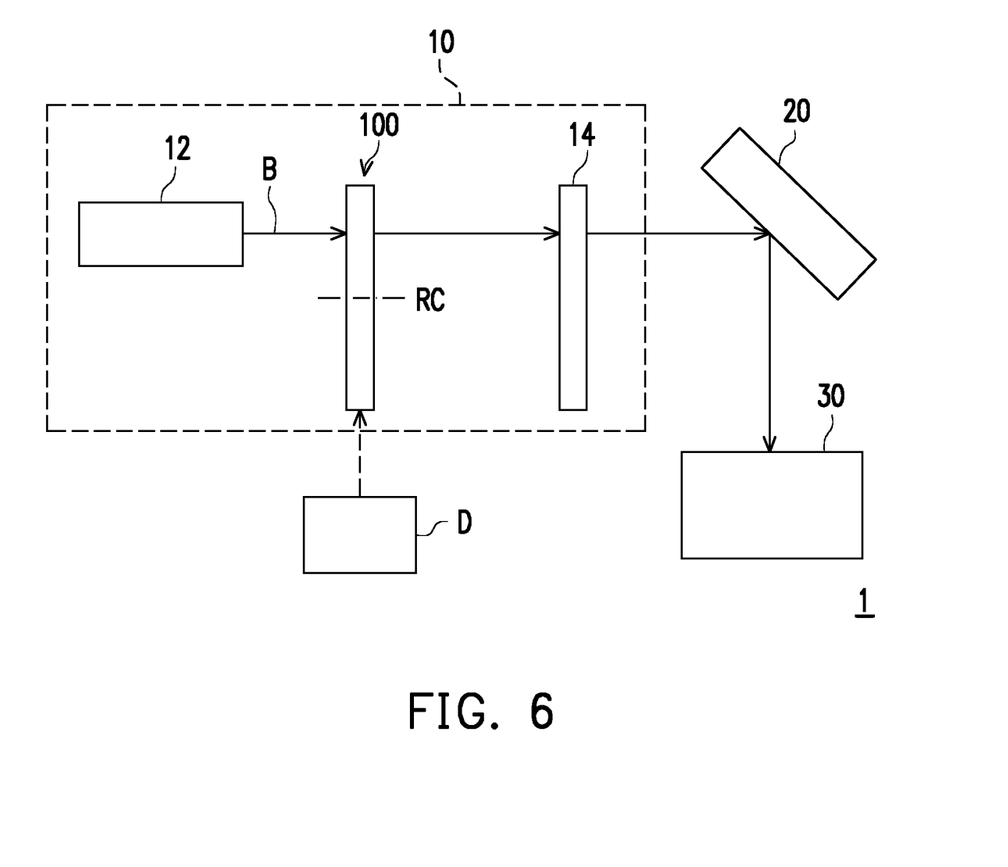
FIG. 6 is a schematic view of a projection device having an illumination module according to an embodiment of the invention.

The optical wavelength conversion module 100 is applicable to any illumination module that requires a variety of colored beams. For example, the optical wavelength conversion module 100 may be configured in an illumination module of a projection device, but not limited thereto. FIG. 6 is a schematic view of a projection device having an illumination module according to an embodiment of the invention. Referring to FIG. 6, a projection device 1 includes an illumination module 10 according to an embodiment of the invention. The illumination module 10 includes an excitation beam source 12 and the optical wavelength conversion module 100. The excitation beam source 12 provides an excitation beam B. For example, the excitation beam B provided by the excitation beam source 12 is a blue laser beam with a power of 200 W or more. The optical wavelength conversion module 100 is disposed on a transmission path of the excitation beam B, and the first phosphor material layer 120, the second phosphor material layer 130, and the third phosphor material layer 140 of FIG. 3 are disposed on a light-receiving surface of the substrate 110 of the optical wavelength conversion module 100. When the optical wavelength conversion module 100 is in the operating state, the driving device D is adapted to drive the substrate 110 to act, such that the first optical region R1, the second optical region R2, the third optical region R3, and the fourth optical region R4 enter the transmission path of the excitation beam B in turn.

When the power of the excitation beam B is 200 W or more, the phosphor material layer may easily have the problems of color distortion and reduction of perceived brightness resulting from the thermal quenching effect, which affects the illumination quality of the illumination module. However, as described above, the optical wavelength conversion module 100 is conducive to improving the color distortion and reduction of perceived brightness resulting from the thermal quenching effect, and therefore the illumination module 10 that utilizes the optical wavelength conversion module 100 has favorable illumination quality.

The illumination module 10 may be applied to the projection device 1, which includes a light valve 20 and a projection lens group 30. A beam (including conversion beams of various colors and the excitation beam) outputted from the illumination module 10 may be transmitted to the light valve 20 and the projection lens group 30 sequentially. The light valve 20 may convert the beam outputted from the illumination module 10 into an image beam (not shown). The light valve 20 is a digital micro-mirror device (DMD), a reflective liquid crystal on silicon (LCOS), or a transmissive spatial light modulator, such as a transparent liquid crystal panel, for example. Nevertheless, the invention is not limited thereto. The projection lens group 30 projects the image beam transmitted from the light valve 20 out of the projection device 1.

The illumination module 10 may further include a filter module 14 to enhance the color purity of the beam outputted from the illumination module 10 or make the color of the image outputted from the projection device 1 meet a required specification. Similar to the optical wavelength conversion module 100, the filter module 14 may include a carrier substrate (not shown), a driving device (not shown), and a plurality of filter material layers (not shown) disposed corresponding to a plurality of optical regions. The driving device is connected to the carrier substrate, and when the filter module 14 is in an operating state, the driving device is adapted to drive the carrier substrate to act (for example, drive the carrier substrate to rotate around a rotation axis thereof), wherein the carrier substrate of the filter module 14 and the substrate 110 of the optical wavelength conversion module 100 rotate synchronously.

The filter material layers are disposed on a light-receiving surface of the carrier substrate for receiving the beam from the optical wavelength conversion module 100. The filter material layers may include a first filter layer corresponding to the first optical region R1 of FIG. 3, a second filter layer corresponding to the second optical region R2 of FIG. 3, and a third filter layer corresponding to the third optical region R3 of FIG. 3. The first filter layer is for example for filtering a colored beam other than the yellow beam and enters the transmission path of the beam in synchronization with the first optical region R1 of the optical wavelength conversion module 100 to enhance the color purity of the yellow beam outputted from the illumination module 10. The second filter layer is for example for filtering a colored beam other than the red beam and enters the transmission path of the beam in synchronization with the second optical region R2 of the optical wavelength conversion module 100 to enhance the color purity of the red beam outputted from the illumination module 10. The third filter layer is for example for filtering a colored beam other than the green beam and enters the transmission path of the beam in synchronization with the third optical region R3 of the optical wavelength conversion module 100 to enhance the color purity of the green beam outputted from the illumination module 10. In the case where the carrier substrate is a reflective substrate, in order to allow the excitation beam to pass through, the carrier substrate may have an opening corresponding to the fourth optical region R4 of the optical wavelength conversion module 100, and a translucent diffuser may be disposed in the opening of the carrier substrate to correspond to the fourth optical region R4. On the other hand, in the case where the carrier substrate is a translucent substrate, the opening may not be formed. Alternatively, in an embodiment, the filter material layers may further include a fourth filter layer disposed corresponding to the fourth optical region R4 of FIG. 3 to filter a colored beam other than the blue beam, so as to enhance the color purity of the blue beam outputted from the illumination module 10. In another embodiment, the filter material layers may be integrated with the optical wavelength conversion module.

In conclusion of the above, the embodiments of the invention achieve at least one of the following advantages or effects. With the pre-compensation mechanism, the phosphor material layer with the emission spectrum having a peak smaller than the peak of the desired emission spectrum is chosen, so as to achieve the effect of shifting the emission spectrum toward the short wavelength side (e.g., blue wave band) when the phosphor temperature is close to or equal to the ambient temperature. By making the amount of the shift toward the short wavelength side close to or equal to the amount of the shift toward the long wavelength side, which occurs when the phosphor temperature of the phosphor material layer is close to or exceeds the preset temperature, the color of the conversion beam that is generated when the phosphor temperature of the phosphor material layer is close to or exceeds the preset temperature is close to or the same as the color desired to be outputted, and the brightness of the conversion beam perceived by the human eyes at different temperatures (e.g., the ambient temperature and the preset temperature) tends to be consistent. Accordingly, the optical wavelength conversion module of the embodiments of the invention is conducive to improving the problems of color distortion and reduction of perceived brightness resulting from the thermal quenching effect, and therefore the illumination module that utilizes the optical wavelength conversion module has favorable illumination quality.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An optical wavelength conversion module, comprising:
   a substrate;
   a driving device connected to the substrate and adapted to drive the substrate to act when the optical wavelength conversion module is in an operating state; and
   a first phosphor material layer disposed on a first optical region of the substrate, wherein when phosphor temperature of the first phosphor material layer is close to or equal to an ambient temperature, a conversion beam generated by the first phosphor material layer is a yellowish green beam, and when the phosphor temperature of the first phosphor material layer is close to or exceeds a preset temperature, the conversion beam generated by the first phosphor material layer is a yellow beam, and when the optical wavelength conversion module is in the operating state, the first optical region emits the yellow beam.

2. The optical wavelength conversion module according to claim 1, wherein the preset temperature is 150 degrees Celsius and the ambient temperature is 25 degrees Celsius.

3. The optical wavelength conversion module according to claim 1, wherein when the phosphor temperature of the first phosphor material layer is close to or equal to the ambient temperature, a peak of an emission spectrum of the first phosphor material layer falls in a range of 542 nm to 547 nm, and when the phosphor temperature of the first phosphor material layer is close to or exceeds the preset temperature, the peak of the emission spectrum of the first phosphor material layer falls in a range of 548 nm to 550 nm.

4. The optical wavelength conversion module according to claim 1, further comprising:
   a second phosphor material layer disposed on a second optical region of the substrate, wherein when a phosphor temperature of the second phosphor material layer is close to or equal to the ambient temperature, a conversion beam generated by the second phosphor material layer is a yellow beam, and when the phosphor temperature of the second phosphor material layer is close to or exceeds the preset temperature, the conversion beam generated by the second phosphor material layer is a red yellow beam, and when the optical wavelength conversion module is in the operating state, the second optical region emits the red yellow beam.

5. The optical wavelength conversion module according to claim 4, wherein when the phosphor temperature of the second phosphor material layer is close to or equal to the ambient temperature, a peak of an emission spectrum of the second phosphor material layer falls in a range of 548 nm to 550 nm.

6. The optical wavelength conversion module according to claim 4, wherein the first phosphor material layer and the second phosphor material layer are each an Yttrium Aluminum Garnet (YAG) phosphor layer.

7. An illumination module, comprising:
   an excitation beam source providing an excitation beam; and
   an optical wavelength conversion module disposed on a transmission path of the excitation beam and comprising:
      a substrate;
      a driving device connected to the substrate and adapted to drive the substrate to act when the optical wavelength conversion module is in an operating state; and
      a first phosphor material layer disposed on a first optical region of the substrate, wherein when a phosphor temperature of the first phosphor material layer is close to or equal to an ambient temperature, a conversion beam generated by the first phosphor material layer is a yellowish green beam, and when the phosphor temperature of the first phosphor material layer is close to or exceeds a preset temperature, the conversion beam generated by the first phosphor material layer is a yellow beam, and when the optical wavelength conversion module is in the operating state, the first optical region emits the yellow beam.

8. The illumination module according to claim 7, wherein the preset temperature is 150 degrees Celsius and the ambient temperature is 25 degrees Celsius.

9. The illumination module according to claim 7, wherein when the phosphor temperature of the first phosphor material layer is close to or equal to the ambient temperature, a peak of an emission spectrum of the first phosphor material layer falls in a range of 542 nm to 547 nm, and when the phosphor temperature of the first phosphor material layer is close to or exceeds the preset temperature, the peak of the emission spectrum of the first phosphor material layer falls in a range of 548 nm to 550 nm.

10. The illumination module according to claim 7, wherein the optical wavelength conversion module further comprises:
 a second phosphor material layer disposed on a second optical region of the substrate, wherein the first optical region and the second optical region of the substrate enter the transmission path of the excitation beam in turn, and when a phosphor temperature of the second phosphor material layer is close to or equal to the ambient temperature, a conversion beam generated by the second phosphor material layer is a yellow beam, and when the phosphor temperature of the second phosphor material layer is close to or exceeds the preset temperature, the conversion beam generated by the second phosphor material layer is a red yellow beam, and when the optical wavelength conversion module is in the operating state and the second optical region enters the transmission path of the excitation beam, the second optical region emits the red yellow beam.

11. The illumination module according to claim 10, wherein when the phosphor temperature of the second phosphor material layer is close to or equal to the ambient temperature, a peak of an emission spectrum of the second phosphor material layer falls in a range of 548 nm to 550 nm.

12. The illumination module according to claim 10, wherein the first phosphor material layer and the second phosphor material layer are each an Yttrium Aluminum Garnet (YAG) phosphor layer.

13. The illumination module according to claim 10, wherein the excitation beam provided by the excitation beam source has a power of 200 W or more.

* * * * *